Aug. 6, 1957          K. FRANCK          2,802,097
LUMINAIRES

Filed Sept. 16, 1952          6 Sheets-Sheet 1

INVENTOR
*Kurt Franck*
BY
ATTORNEY

Aug. 6, 1957  K. FRANCK  2,802,097
LUMINAIRES
Filed Sept. 16, 1952  6 Sheets-Sheet 2

INVENTOR
*Kurt Franck*
BY
*John M. Cole*
ATTORNEY

INVENTOR.
KURT FRANCK
BY John M Cole.
ATTORNEY

United States Patent Office

2,802,097
Patented Aug. 6, 1957

2,802,097

LUMINAIRES

Kurt Franck, Newark, Ohio, assignor to Holophane Company, Inc., New York, N. Y., a corporation of Delaware Application September 16, 1952, Serial No. 309,890

15 Claims. (Cl. 240—106)

The present invention relates to luminaires, and is more particularly directed toward luminaires having light transmitting refractors which in normal use are in the direct line of observation and have light spreading prisms which evenly spread the brightness of the refractor over wide areas of its surface.

The invention is more particularly directed toward improving the brightness characteristics of lighting equipment with vertically elongated sources of brightness, either virtual or actual, and viewed throughout horizontal angles of approximately 180°, and which emit substantially all of the useful flux in such directions. Under certain conditions the improvements are useful where the long sources are horizontal, as in overhead fluorescent lighting.

The vertically elongated sources of brightness may typically be the spread secondary source produced by concentrating horizontal prisms of a refractor acting on light from a point source, or vertically elongated high or low intensity sources without concentrating prisms. The former type of brightness source is employed in refracting equipment for the lighting of horizontal surfaces, such as in yards, and the like, where all the light is to fall in a generally semicircular area from any point in which the observer may look directly at the luminaire. Such equipment, owing to the high intensity source and the vertical concentration of light into high angles above the horizontal is especially well suited for improvement, both as to appearance and efficiency, by utilization of the novel light controlling means in the form of light spreading prisms of preselected variant refracting powers to be set forth herein.

Where a concentrated filamentary source is used, the vertical concentration into high angles may be effected by annular prisms on an inner refractor prior to lateral control by an outer refractor, or it may be effected by annular refracting prisms on the outside of the same refractor which carries the prisms for lateral control.

Where the brightness control for the dominant light output is, according to the present invention, effected by such spreading prisms on a vertical refracting band about an inner refractor which delivers light at high angles from the nadir for yard lighting, it is also an object of the invention to more effectively control, by means of prisms on the bottom of the bowl which carries the spreading prisms, the light emitted to less steep angles in such a manner as to illuminate the nearer yard areas and keep as much light as possible from being emitted back of the luminaire. Not only is the present invention suitable for use in the lighting of yards where the spread of light throughout substantially 180° azimuth angle is desired, but certain features thereof are also suitable for use in side of street mounted units for lighting relatively wide streets. In such cases light is deviated from the 90° azimuth plane or across the street in directions to be in toed-in beams.

Other and further objects will appear as the description proceeds.

The accompanying drawings show, for purposes of illustrating the present invention, three embodiments in which the invention may take form, together with modifications of certain parts, it being understood that the drawings are illustrative of the invention rather than limiting the same.

The lighting of extended yard areas by refracting equipment has generally employed symmetric refracting bowls with inner components providing vertical redistribution and outer components with symmetrical diffusing flutes to spread the light and effect a lighted appearance of the luminaire in all directions. Where the units were mounted on the side of a building, or at the edge of the field, much of the light was lost by being spilled outside the area. In such locations the optimum distribution pattern is one in which the maximum intensity is in a cone toward the area of the desired vertical angle and extending through a horizontal angle of 180°. This distribution is employed in side of street mounted street lighting equipment where the street width is from three to five times the mounting height. Typical refracting equipment for such purposes is shown in Dorey 1,554,563. This type of light distribution is classified by the Illuminating Engineering Society as Type IV and is now rarely used for direct lighting.

Figure 1:
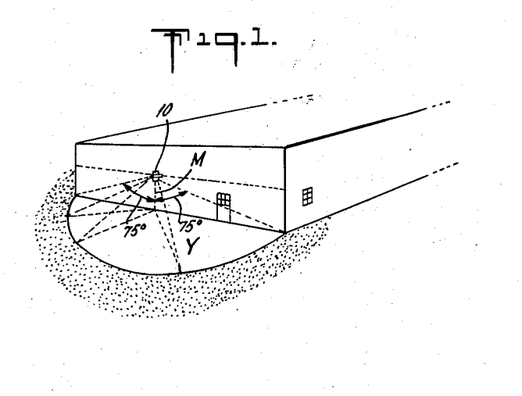
Figure 1 is a perspective view illustrating a yard luminaire mounted adjacent a building wall and diagrammatically showing the type of distribution obtained.
Figure 2:
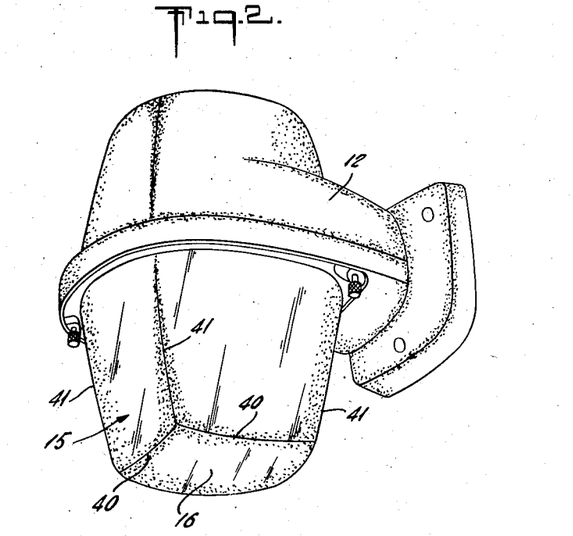
Figure 2 is a perspective view of the entire luminaire as viewed from below.

To achieve this type of distribution with high efficiency and satisfactory appearance, the present invention contemplates an entirely different form of luminaire, mounted at a suitable mounting height M above the yard area Y. The light is sent out at a suitable angle such as 75° above the nadir so as to spread over a semicircular area whose radius is approximately four times the mounting height. This region is inside the stippled area of Figure 1.

Figure 9:
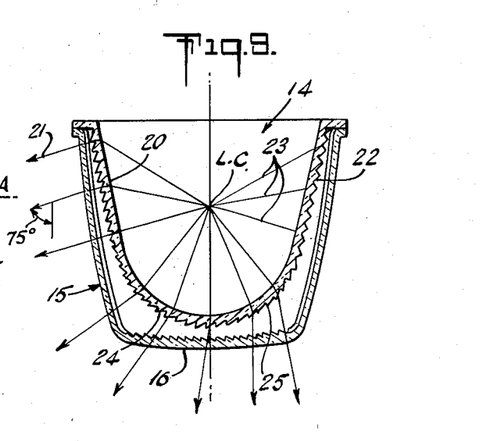
Figure 9 is an enlarged sectional view of the inner and outer refractors, illustrating light paths in a vertical plane and taken on the plane of symmetry or on the line A—A of Figures 3, 4, 5, 8, and 10.
Figure 10:
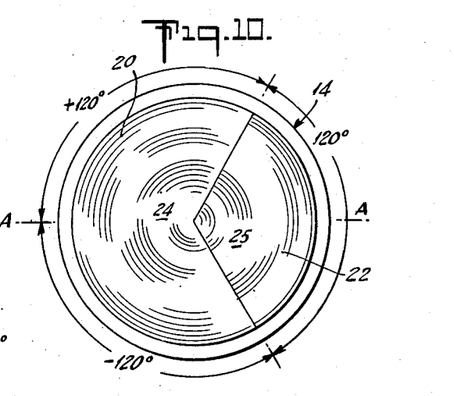
Figure 10 is an inverted plan view of the inner refractor only.

A suitable luminaire 10 for this purpose is illustrated generally in the drawings and employs a suitable bracket 12 carrying a pendent lamp 13 and supporting two refracting bowls nested as indicated at 14 and 15. The inner refractor 14, as illustrated more particularly in Figures 9 and 10, is a relatively deep bowl with steep side walls and is designed so that the light source is well below the upper flange of the bowl. When the light center is at the point indicated LC, Figure 9, the vertical light ray paths in the 0° to 180° azimuth plane of symmetry A—A of Figure 10 are as indicated in Figure 9. Throughout approximately +120° and —120° azimuthal angle from the plane of symmetry, or 240° over-all (Fig. 12), the inner refractor 14 has horizontal light concentrating prisms 20 above and below the light source which concentrate the light rays 21 in the vertical angles of approximately 75° from the nadir and 240° about the vertical axis. The opposite or rear part of the refracting bowl 14, through an azimuthal angle of 120°, has external horizontal totally reflecting prisms 22 which return the light rays on the same path to the light center as indicated at 23. Thus the dominant light output from the source is emitted through about 240° horizontal angle and at about 75° vertical angle.

Below the refracting prisms 20, the inner refractor 14 has annular refracting prisms 24 which spread the light forwardly from the nadir. Below the reflecting prisms 22 on the rear side of the refractor 14, the refractor has annular refracting prisms 25 which bend the light toward the nadir.

Figure 11:
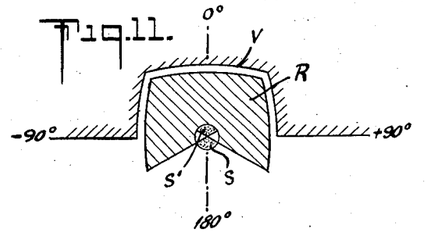
Figure 11 is a diagrammatic illustration showing the light pattern on the ground produced by the inner refractor alone.

The general light pattern on the ground from the inner refractor 14 alone of Figures 9 and 10 is illustrated in Figure 11. The line V is the line beyond which light from the side portions of the refractor falls for ground illumination. It corresponds with the steepest rays from the inner refractor. The cross-hatched area R shows the ground pattern where the light from the refracting prisms 24 would fall, and as these refracting prisms occupy more than 180°, some light is sent back of the —90° and +90° lines. This would spill backward and be lost, unless redirected into useful directions. The light from the back third of the inner piece falls on the small stippled areas S, S'. The strip between V and R would receive no light from the inner refractor, if used alone.

A refractor such as refractor 14 of Figures 9 and 10 would, if viewed without any covering whatever, produce extremely bright vertical glint lines over the surfaces of prisms 20 and through the 240° azimuth. The remainder of the refractor in the field of view would be "cold."

The outer refractor 15, which receives the inner refractor, protects the external refracting and reflecting prisms of the inner refractor from dirt and is designed to improve the brightness appearance of the luminaire without adversely affecting the dominant direction of the light rays produced by the inner refractor. It also restores backwardly spilled light to useful directions.

In order to improve the appearance of the unit and provide greater area at the bottom for the redirection and control of the downwardly directed light from the inner refractor, the outer refractor 15 is made annular at the top and quasi-square at the bottom 16, with the bottom downwardly convex as will appear in the drawings. Such an enclosure, when viewed in the ordinary angles of observation provides a relatively wide and vertical deep area over which it is possible to spread the brightness. When such a luminaire is viewed from the front, diagonally or from the sides, it is desirable that the useful light output be confined as much as possible to regions within a 180° azimuthal angle rather than the 240° azimuthal angle of the reflecting and refracting prisms of Figures 9 and 10 and as indicated in the ground pattern of Figure 11.

Figure 3:
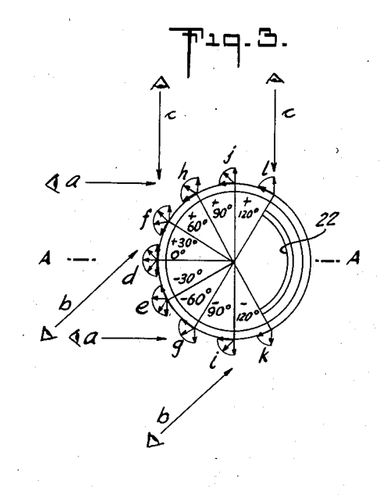
Figure 3 is a diagrammatic horizontal view illustrating an annular section of a luminaire designed for mounting in locations such as Figure 1 and having for a 180° horizontal viewing angle the widest possible ray distribution and best lighted appearance.

If the light were to be spread to the greatest possible extent by the outer refractor 15, the width of the source of luminosity, when viewing the refractor in the plane of symmetry A—A would be the diameter of the refractor as shown by the spacing of lines a—a of Figure 3. Similarly, the luminous area of the refractor viewed diagonally would be the same width as indicated by the spacing of diagonal lines b—b, and when viewing the refractor from the extreme right or left of the plane of symmetry, the luminous area would be narrowed as indicated by the spacing of lines c—c. The lines a—a, b—b and one of the lines c is tangent to the surface of the refractor, while the line c at the right of Figure 3 is to correspond with the rearmost, +90°, ray available from the horizontal refracting prisms without rearward spillage. To obtain such width of bright surface the emitted sector of light at d (0° azimuth) would be 180° wide, the sectors at e and f (+30° and —30° azimuth) would be 150° wide, the sectors at g and h would be 120° wide, those at i and j would be 90° wide and those at k and l 60° wide. Such spreading of limiting rays, however, is not practical where efficient output of light is concerned. As will be noted from the sectors d—l, inclusive, emission of substantial light flux would be called for in directions tangent to the refractor surface. Light emission in tangential directions is nil, for above angles of refraction beyond about 85° a large portion of the light in the medium is near the critical angle and is internally reflected in the medium.

Instead, however, of having the light emitted from points on the surface at or near the tangency, the present invention contemplates controlling the emission of light so that it is not emitted at such high angles from the normal. An efficient maximum angle of refraction in refractors such as here involved is about 60°.

Figure 4:
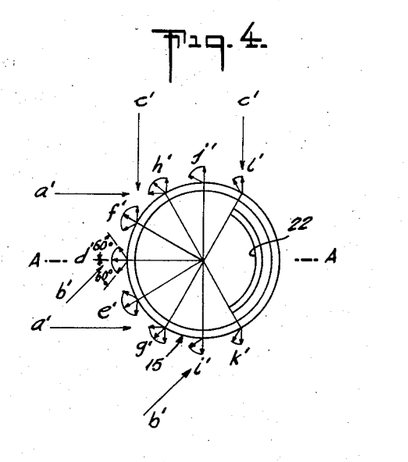
Figure 4 is a view similar to Figure 3 illustrating practical limiting rays suitable for avoiding high losses in light transmission.

The preferred distribution for the annular refractor is that indicated in Figure 4. Here the lines a', a', b', b' and c', c' are more closely spaced than corresponding lines a, b and c, respectively, of Figure 3, and these spacings indicate the width of the luminous areas of the refractor when the light spread is reduced to permit more efficient light transmission. Here the sector d' on the 0° azimuth direction is 120° wide so that the maximum angle of refraction is 60°. Corresponding 60° limits for the angles of refraction are employed at all the sectors. The sectors at e', f' are 120° wide, at g', h' 90° wide, at i', j' 60° wide, and at k', l' 30° wide.

Figure 5:
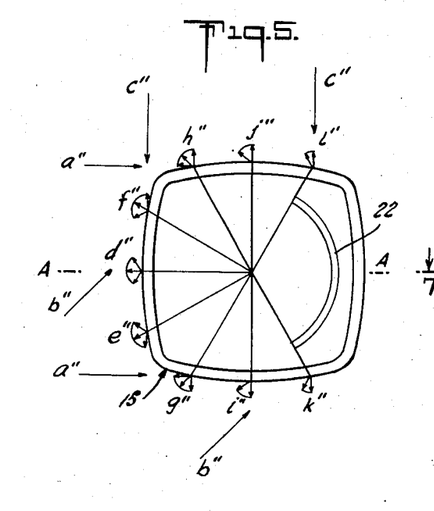
Figure 5 is a view similar to Figure 4, illustrating the practical limiting rays for a luminaire of quasi-square cross section.
Figure 6:
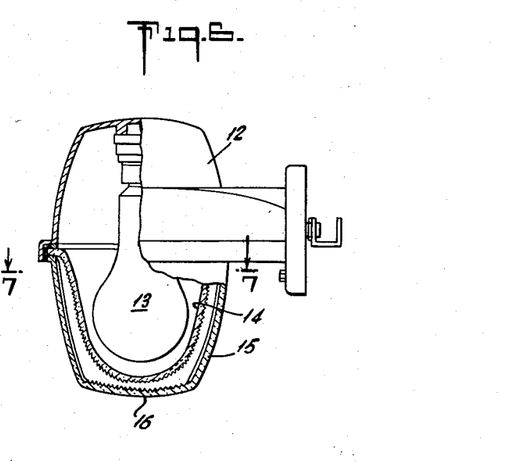
Figure 6 is a vertical sectional view through the luminaire of Figure 2, illustrating the source, and the inner and outer refractors.

Toward the bottom of the refractor, where it approaches the square shape, the radii of curvature of the surfaces increase and it is not readily possible to maintain the same angular width of the sectors as shown in Figure 4, and avoid the higher losses which follow from the higher angles of refraction. To obtain better lighted appearance, it is preferable to maintain over the entire height of the refractor the same angular spread of rays in corresponding azimuths and accept losses in such regions. The dominant lumen output is of course being transmitted by the steeper, more nearly annular portions of the refractor and the lumen output in the lower zones is relatively small. In Figure 5, drawn at an enlarged scale, the lines corresponding with lines a, b, and c of Figures 3 and 4, are marked a", etc., and the corresponding sectors are indicated at d" to l", inclusive.

To achieve the type of distribution diagrammatically set forth in Figures 4 and 5, the inner surface of the outer refractor is provided with vertical light spreading and redirecting prisms which are varied in the different azimuths of the refractor, depending upon the work which is to be performed.

Figure 7:
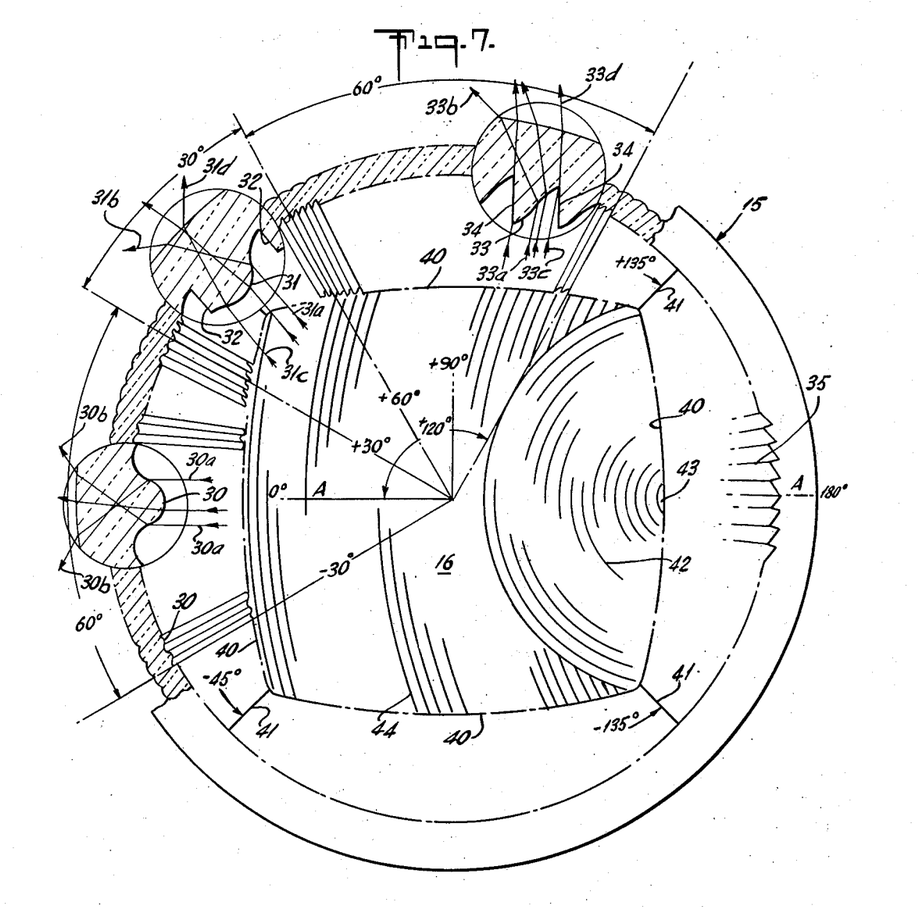
Figure 7 is a horizontal sectional view on the line 7—7 of Figure 6 through the outer refractor only.

Figure 7 illustrates the prismatic layout to effect the redirection of the light. In the median sector, between the +30° and —30° azimuth angles, the inner surface of the refractor is provided with light spreading prisms such as illustrated at 30. These prisms may be alike throughout the sector and are symmetric with respect to the radial plane and have concave-convex profile, preferably such that the greatest deviation which can be given the radial rays incident at the points of inflection, for example the rays 30a, 30a are 60°. This corresponds with an angle of incidence of 75° at the points of inflection of the curves. Hence the emitted rays 30b, 30b are at angles of 60° from the radial plane as also shown at d' in Figure 4.

Laterally of the central sector of symmetrical prisms 30 and through an angle of between +30° and +60°, also between angles of —30° and —60°, the inner surface of the refractor has asymmetric refracting prisms 31. These prisms have concave-convex active surfaces which act differently on the rays to be bent toward the plane of symmetry and those to be bent away from the plane of symmetry. At the point of inflection on the far side of the prism (away from plane A—A), the angle of incidence is the same as above and radial rays such as 31a have a maximum deviation from the radial plane of 60° and are emitted as indicated at 31b. The point of inflection of the near side of the prism is such as to provide an angle of incidence such that a ray 31c is deviated in the direction as indicated at 31d or at azimuth angle of +90° maximum. The asymmetric prisms 31 are separated by radial inactive surfaces 32. The prisms in these lateral sectors preferably increase in asymmetry with increase in azimuth angle of the prism, or are all alike, at sacrifice of brightness pattern if desired.

In the outer lateral sectors between +60° and +120° azimuth angle, also between —60° and —120°, the prisms are asymmetric but of still different contour than those in the 30° to 60° sectors. Here the prisms such as 33 have concave-convex, sinuous surfaces with maximum refracting angle at the point of inflection for radial rays such as 33a so as to deviate them so as to be not more than 60° from the normal as indicated at 33b. The curvature of the inactive faces of the prisms 33 is such that the maximum angle of emission of incident rays such as 33c is as indicated at 33d not more than 90° azimuth angle. The refracting prisms 33 are separated by the radial inactive surfaces 34. These prisms also preferably vary in refracting power to emit rays between 90° azimuth angle and 60° from the radial plane.

Throughout the regions (+120° or —120°) each prism emits a spreading beam of light and these overlap so as to make the entire projected area within the bounding rays luminous at angles of observation included therebetween.

The part of the outer refractor in the +120° to —120° zone and opposite the totally reflecting prisms 22 of the inner piece receive little light—only that which leaks through between the prisms. It is preferably provided with vertical prisms 35 of uniform direction and designed to spread the light away from the 180° direction and reduce rearward spillage.

The part 16 of the outer refractor, as shown in Figures 2, 6, 7 and 8, is bounded by the four arcuate lines 40, 40'. These lines are generally at right angles to and parallel with the plane of symmetry, so that when the luminaire is viewed from the front it is slightly narrower than when viewed diagonally. The corner lines 41 extend upwardly and merge with the annular contour. This bottom portion of the outer refractor receives light from prisms 24 and 25 on the inner refractor and is provided on its upper surface with prisms which extend transversely of the plane of symmetry and are for the purpose of spreading this downward light over the adjacent yard areas. Instead of using a system of prisms at right angles to the plane of symmetry, better results are obtained by using two systems of concentric prisms. The rear system indicated at 42 is centered at 43 in the plane of symmetry and at the rear of the rear quadrant of the outer refractor. Forwardly of this substantially semicircular area of concentric prisms, the bottom of the bowl is provided with a second series of concentric prisms indicated at 44 of much greater radius of curvature. The rear concentric prisms 42 receive the light from the rear of refracting prisms 25 on the inner refractor, while the forward concentric prisms 44 receive the forwardly deviated light from the prisms 24 on the bottom of the inner refractor.

Figure 8:
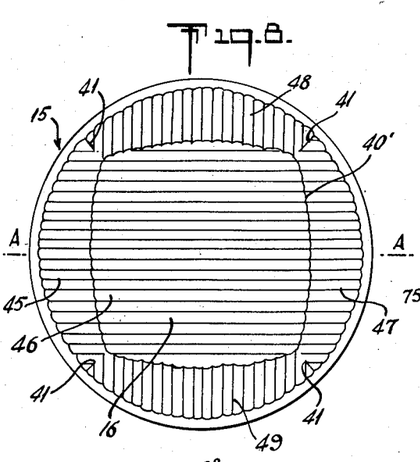
Figure 8 is an inverted plan view of the outer refractor showing the external diffusing flutes.

To improve the appearance of the refractor, both when lighted and unlighted, obscure the inner refracting prisms and keep as much light as possible from being spilled rearwardly, its exterior surface is provided with relatively shallow vertical flutes. On the front and rear faces and the bottom, the flutes 45, 46, 47 are parallel with the plane of symmetry. On the side faces, flutes 48 and 49 are parallel with one another, but at right angles to the plane of symmetry. Most of the diffusing action takes place in the +90° and —90° directions and relatively little light is spilled rearwardly. These flutes are relatively shallow, preferably with maximum diffusion of the order of 5°, so that they do not build up divergence substantially beyond the 60° angle to the general annular shape.

Figure 12:
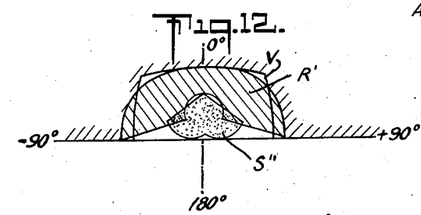
Figure 12 is a view similar to Figure 11, showing the light pattern produced by the combined inner and outer refractors.

Comparison of Figures 11 and 12 indicates the change in ground pattern achieved by the outer refractor. The cross-hatched area R' now shows that the light from the front ⅔ of the unit is spread so as to be in front of the 90° lines and out near the line V, while light in the stippled area S'' is spread over a larger ground area and pushed forwardly of the 90° lines.

Figure 13:
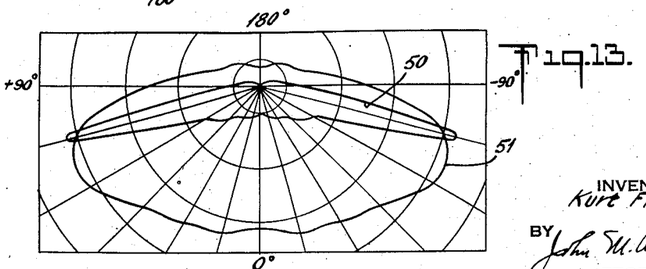
Figure 13 is a polar diagram illustrating light distribution from the yard luminaire of Figures 1 to 12.

The performance of the luminaire is indicated by the photometric curves of Figure 13. Here the curve 50 illustrates the vertical light distribution through 65° lateral and the curve 51 the horizontal light distribution curve in a 75° cone. It will be noted that the maximum candle power is at 75° above the nadir and that the horizontal distribution is a very wide distribution throughout the front 180° from the luminaire. Only a comparatively small amount of light is spilled backwardly and not available for lighting in the yard area desired.

Luminaires constructed according to the present invention have been found to have very high efficiency producing light outputs in the order of 30% better in the useful zone than symmetric units of corresponding input heretofore available for yard lighting. This increase in efficiency is to a large extent due to the restriction of light emission to angles at which efficient light transmission can be had. The effect is more especially apparent where inside frosted lamps are used, for with such lamps a substantial portion of the total light output comes from the large area of the bulb and, with prisms such as shown and described here, more of the light from the periphery of the large light source is accepted and transmitted by the refractor. A unit mounted 10 feet above the ground using a 200 watt lamp will illuminate a semicircular area of 35 foot radius with an average illumination of 0.5 foot candle.

Figure 14:
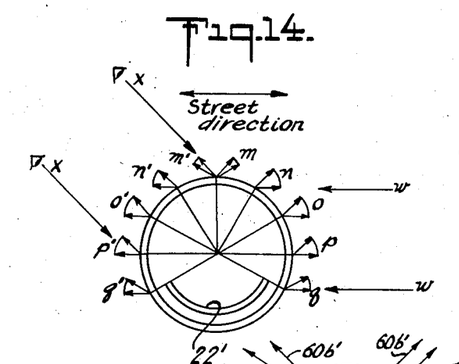
Figure 14 is a diagrammatic view similar to Figure 4, illustrating light ray spread suitable for a side of street mounted street lighting luminaire.
Figure 15:
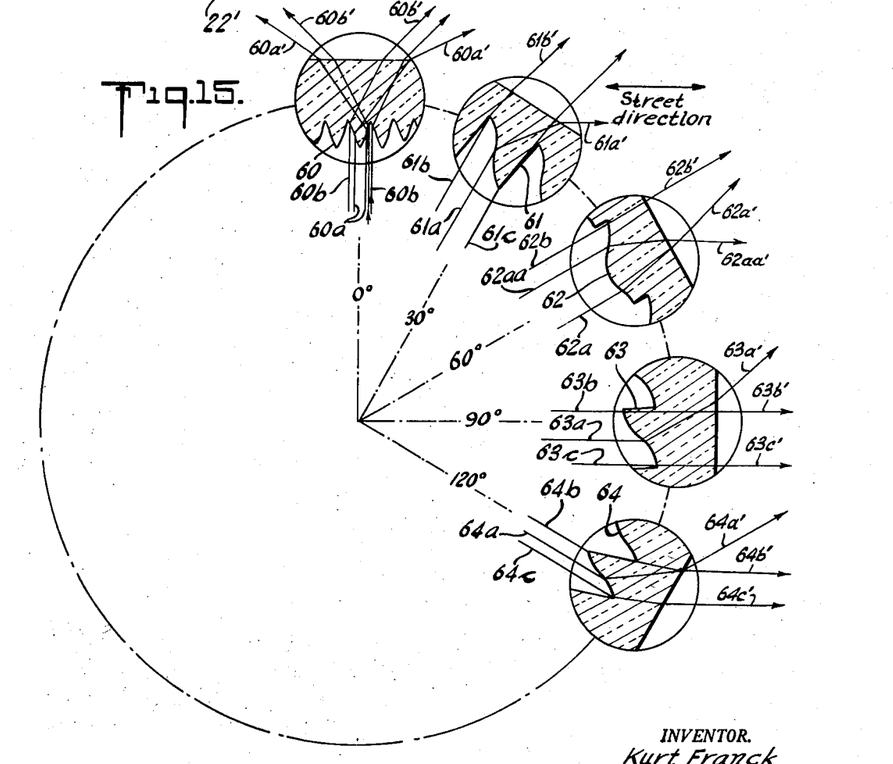
Figure 15 is a horizontal section through a refractor for obtaining the ray spreads indicated in Figure 14.
Figure 16:
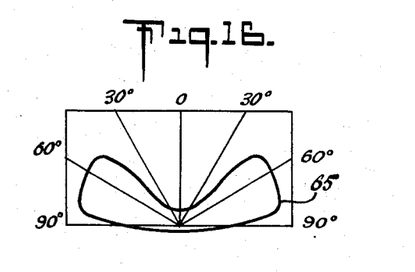
Figure 16 is a polar diagram illustrating the type of distribution secured from the street lighting luminaire of Figure 14.

The street lighting luminaire of Figures 14 to 16 may utilize a reflector 22' like reflector 22 and may have an outer refractor of the general contour of the one above described in detail, but with a different arrangement of vertical light spreading prisms.

At the front of the refractor (Fig. 14), corresponding with the region d' of Figure 4, the light is transmitted in sectors m and m' approximately 15° wide with the greatest angle of refraction 60° in air, i. e., the maximum angle from the normal to the glass surface. As it is desired to concentrate the output so that the least possible light is emitted beyond ±90° and as much as possible is beyond ±45°, the sectors at n n', o o', and p p' are approximately 45° wide. The sectors q q' are narrowed to 30° so that the maximum angle of refraction of 60° is retained.

Prisms such as 60, Fig. 15, in the 0° direction are double acting, symmetric prisms with nearly straight faces. The profiles gradually change so that the prisms 61 at ±30° are single acting, asymmetric, the prisms 62 at ±60° are double acting, asymmetric, and the prisms 63 and 64 at ±90° and ±120° are single acting, asymmetric. Midway between ±90° and ±45° or ±67½° the prisms would be symmetric. Light ray paths at the points of inflection of the prism faces are indicated by the lines 60a 60a', 61a 61a', 62a 62a', 62aa 62aa', 63a 63a', and 64a 64a'. Other typical rays are indicated at 60b 60b', 61b 61b', 62b 62b', 63b 63b', 64b 64b', 63c 63c' and 64c 64c'.

When the refractor of Figures 14 and 16 is viewed in diagonal directions as at x—x, Fig. 14, or in the street direction as at w—w, it is luminous over substantially its entire width and from top to bottom. The horizontal light distribution is indicated in Figure 16 at 65.

Figures 17, 18, 19:
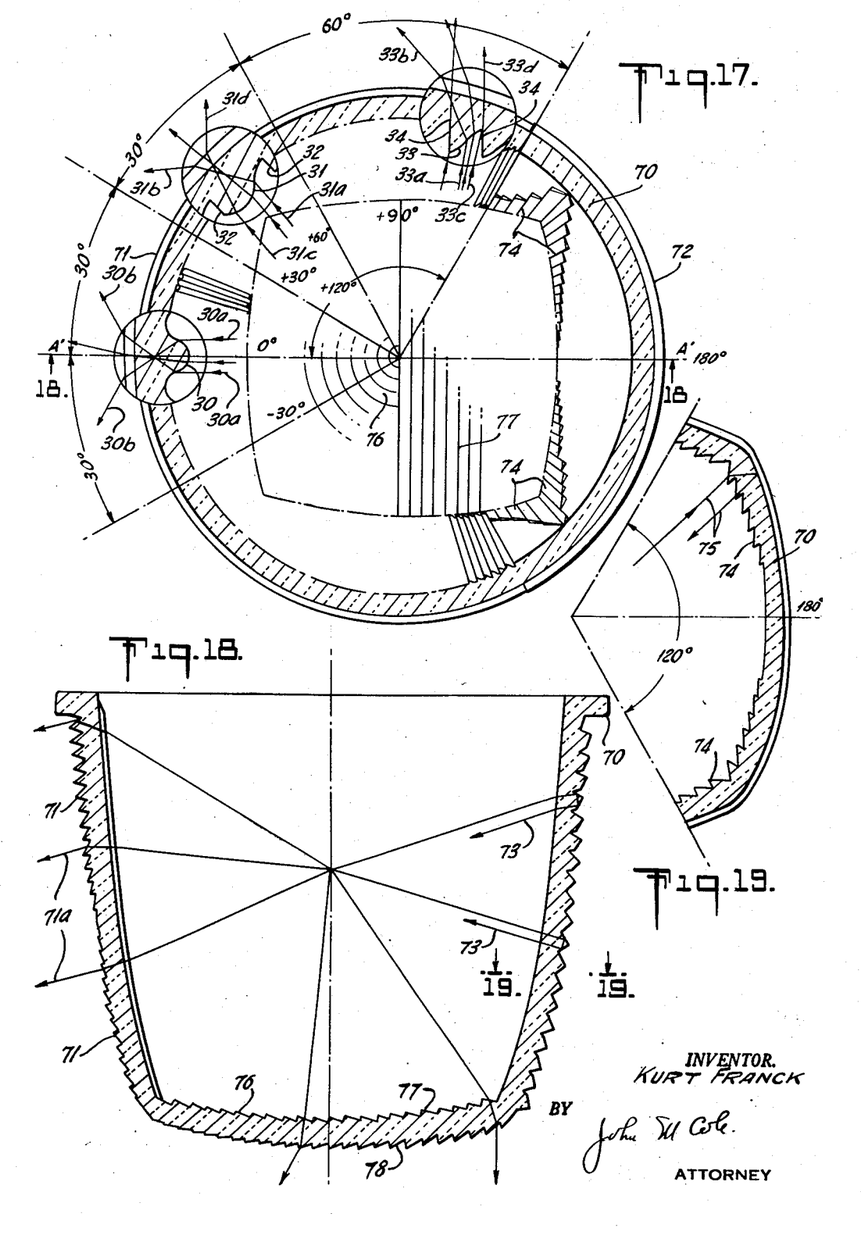
Figure 17 is a horizontal sectional view through a luminaire utilizing a one-piece prismatic unit for vertical and lateral light control.
Figure 18 is a sectional view taken on the line 18—18 (0°–180°, plane A'—A') of Figure 17.
Figure 19 is a fragmentary section on the line 19—19 of Figure 18.

In the form shown in Figures 17, 18 and 19, a one-piece refractor 70 carries all the prismatic light controlling elements. It is shown as having the same general shape as the outer refractor of Figures 1–13 and arranged for a light redistribution like that obtained from the two-piece construction there shown.

The inner walls of the refractor between 0° and 120° each side of the plane of symmetry A'—A' has prisms like those in the corresponding region of Figure 7 and reference characters 30—34, inclusive, are similarly applied. Instead of having the outer walls fluted as in the first forms discussed, the outer surfaces in the 0°–120° region are provided with horizontal light condensing prisms 71 which concentrate the rays into generally parallel directions about 75° above the nadir as indicated at 71a.

The rear outer surface of the refractor 70, between +120° and —120° is provided with horizontal, totally reflecting prisms 72, which, as shown at 73, reflect the light toward the source. Near the bottom of the refractor the inner rear surfaces have short vertical prisms 74 which cooperate with the totally reflecting prisms opposite them to bring the light back to the light center as indicated at 75.

The upper surface of the bottom of the refractor 70 has systems of curved prisms 76 near the front, and of parallel prisms 77 to the rear, while the lower surface has refracting prisms 78. These collect light below the refractor walls and direct the rays in generally forward directions.

This application is a continuation-in-part of the application Serial No. 296,040, filed June 27, 1952 and now abandoned.

Since it is obvious that the invention may be embodied in other forms and constructions within the scope of the claims, I wish it to be understood that the particular forms shown are but three of these forms, and various modifications and changes being possible, I do not otherwise limit myself in any way with respect thereto.

What is claimed is:

1. A refracting band adapted to receive an axially disposed light source and having walls generally parallel with the axis and symmetrical on opposite sides of a longitudinal radial median plane, the walls throughout an angle of substantially 120° each side of the said median plane being provided with internal, contiguous, symmetrically disposed, longitudinally extending light spreading prisms of concave-convex transverse profile and of limited refracting power which deviate radially incident light and transmit it in directions which make acute angles of variable value for each prism so as to spread the light from each prism about in the corresponding included angular region and confine it to said region, emit spreading beams of light which overlap and make the entire projected area of the refractor within the bounding rays luminous at angles of observation in said region, without spillage beyond said region.

2. A refracting band as claimed in claim 1, wherein the band is generally annular about a normally vertical axis with the light spreading prisms to the front and the band has throughout the rear internal light refracting prisms of uniform size on opposite sides of the median plane which spread rearward light away from said plane.

3. A refracting bowl adapted to receive light from an axially disposed light source, the bowl being symmetrical about a vertical median plane and relatively steep side walls which taper downwardly from an annular top section to a quasi-square lower section, the sides of the square being at right angles to and parallel with the median plane, the front and side portions of the side walls having internal contiguous, symmetrically disposed, vertical light spreading prisms of concave-convex horizontal profile disposed throughout an angle of substantially 120° each side of the median plane and of limited refracting powers which deviate radially incident light and transmit it in directions which make forward acute angles of variable value for each prism so as to spread the light about in the included angular region, confine it to that region and make substantially the entire projected area luminous at angles of observation within said region, without spillage beyond said region.

4. A refracting bowl such as claimed in claim 3, having the front and rear quarters of the outer surface provided with parallel vertical diffusing flutes and the side quarters provided with parallel vertical diffusing flutes in vertical planes at right angles to the first mentioned flutes.

5. A refracting bowl such as claimed in claim 4, having throughout the rear internal light refracting prisms of uniform size on opposite sides of the median plane which spread rearward light away from said plane.

6. A refracting bowl such as claimed in claim 3, wherein the bowl has a downwardly convex bottom provided with prisms which extend across the median plane and of refracting power to deviate relatively steep incident rays forwardly.

7. A refracting bowl such as claimed in claim 6, wherein the rear portion of the prisms on the bottom are concentric about a center in the median plane substantially at the rear of the square bottom and the forward portion of the prisms in the bottom are concentric about a center to the rear of the first center.

8. In combination, a refracting band generally annular about a vertical axis and having side walls generally parallel with the axis and symmetrical on opposite sides of a vertical radial median plane, at the front throughout an angle of substantially 120° each side of the said median plane being provided with internal, contiguous, symmetrically disposed, vertically extending light spreading prisms of concave-convex transverse profile and of limited refracting power which deviate radially incident light and transmit it in directions which make acute angles of variable value for each prism so as to spread the light from each prism about it in the corresponding included angular region, emit spreading beams of light which overlap, and make the entire projected area of the refractor within the bounding rays luminous at angles of observation in said region, the band having throughout the rear vertically extending, internal light refracting prisms of uniform size on opposite sides of the median plane which spread rearward light away from said plane and an inner refracting band having opposite the light spreading prisms of the outer band horizontal light condensing prisms and opposite the rear prisms of the outer band horizontal totally reflecting autocollimating prisms, and a substantially point light source at the focal point of the horizontal prisms.

9. The combination of claim 8 wherein both bands are closed at the bottom to form bowls, the inner bowl having below the light condensing prisms annular prisms which deviate the light forwardly, the bottom of the outer bowl having prisms which further deviate the light received from the bottom of the inner bowl.

10. A refractor occupying substantially more than 180° about an enclosed source of light and adapted to be viewed through 90° each side of a plane of symmetry, the refractor of substantially cylindrical form having through an angle of substantially 240° internal light spreading prisms of concave-convex profile extending generally parallel with the axis, the points of inflection of the active faces remote from the plane of symmetry being at substantially constant angles of incidence to radial rays and of such value as to effect, in cooperation with the external surface a uniform deviation of substantially 60° toward the plane of symmetry, the limiting refracting power of the prisms for spreading light away from the median plane being variable and such that ray emission is confined within substantially 90° from the median plane.

11. In combination, means for producing a relatively narrow, vertically elongated source of high brightness when viewed from regions in an azimuth angle of approximately 240° extent, and an enclosing envelope intercepting all light emitted in said angular region and transmitting it without substantial change in vertical directions, said envelope being symmetrical about a median vertical radial plane and having vertical light spreading prisms arranged in groups characterized in that those in the front group adjacent the median plane have symmetrical light incident faces of such refracting power as to spread the emitted rays and confine them to angles within substantially 60° each side of the radial plane, in that those in the rear group most remote from the medial plane have sinuous light incident faces on which radial rays fall on the same side of the normals to the surface and of such refracting power to spread the rays in generally forward directions and confine them within forwardly acute angles within substantially 30° minimum from the radial plane, and in that those between the first and second mentioned groups have asymmetric light incident faces on which a major portion of the incident rays fall on the same side of the normals to the surface as those in the second group and a minor portion of the rays fall on the other side of the normal to the surface, said surfaces being of such refracting power as to spread the rays in generally forward directions and confine them within substantially 30° from the radial plane, whereby substantially the entire projected area of the envelope at angles of observation within the azimuth region stated appears luminous and the width of the apparent light source is substantially the diameter of the envelope.

12. A luminaire for lighting yard areas of generally semicircular configuration, comprising a substantially point light source, an inner prismatic light redirecting component annular about a vertical axis and having throughout substantially more than 180° horizontal angle and above and below the horizontal through the source refracting prisms which concentrate light into high angles below the horizontal for lighting remote yard areas, and an outer light redirecting component which receives the inner component and has each side of a median vertical plane vertical prisms which redistribute the light horizontally, each of the prisms having variant refracting power over its surface with a maximum refracting power such that the maximum deviation of light is approximately 90° from the radial plane and the included angle between rays from the rearmost vertical prisms is not more than 180° to avoid backward spillage of light and render the entire area of the second component provided with such vertical prisms luminous at all angles of observation from forward locations.

13. A light spreading refractor of generally annular form about a vertical axis and having substantially more than 180° of its inner periphery occupied by vertical contiguous refracting prisms each with concave and convex portions, and having for radially incident light substantially uniform maximum refracting power of substantially less than 90° in directions toward the median vertical plane and of variant and lessened maximum refracting power in directions away from the median vertical plane and in amounts such that the emitted light throughout the region of more than 180° is confined to an angular spread of not more than about 180°, and the surface of the refractor throughout the region occupied by the vertical prisms appears luminous in all azimuths of observation throughout said 180°.

14. A refractor having a horizontal band of substantially uniform thickness in vertical planes to transmit light outwardly through it without substantial change in verical angle, and having on the inner surface vertical prismatic ribs for controlling brightness distribution of the refractor, when viewed from its front and from its sides, the vertical ribs in a central frontal region on each side of median plane being concave-convex symmetrical and of refracting power for radial rays to limit the spread of corresponding emitted rays to substantially less than 90° from the azimuth plane thereof, the ribs in the lateral frontal regions being concave-convex asymmetrical, separated by radial inactive surfaces and of refracting power for radial rays to limit the spread of corresponding emitted rays in corresponding amounts on the side of the azimuth plane toward the median plane and in less amounts on the side of the azimuth plane remote from the median plane, the ribs in the lateral regions being of S-shaped horizontal profile between radial inactive surfaces and of refracting power for radial rays to limit the spread of corresponding emitted rays in corresponding amounts on the side of the azimuth plane toward the median plane and in still less amounts on the side of the azimuth plane remote from the median plane.

15. In combination, a light source, an inner refracting envelope about the source and having throughout substantially more than 180° horizontal angle horizontal light concentrating prisms which reduce the vertical angle of the light and produce a vertical, relatively narrow region of high brightness when viewed in corresponding directions and in the remaining horizontal angle totally reflecting prisms which reflect light onto the refracting prisms, and an outer refracting envelope about the inner envelope and having vertical light refracting prisms opposite the horizontal prisms of the inner envelope for transmitting refracted light without change in vertical distribution but with altered horizontal direction, said vertical prisms including opposite the central portions of the horizontal refracting prisms a system of symmetrical prisms and having maximum refracting power to limit the emitted light to substantially less than 90° in both directions from the radial plane of the direct light, a second system of asymmetric prisms on each side of the first system and of substantially the same refracting power in the direction toward the first system of prisms and of substantially less maximum refracting power with direction remote from the first system, and a third system of asymmetric refracting prisms beyond the second system and of substantially the same maximum refracting power in the direction toward the first system and still less maximum refracting power in the direction remote from second system.

References Cited in the file of this patent

UNITED STATES PATENTS

| 563,836 | Blondel et al. | July 14, 1896 |
| 1,612,804 | Dorey | Jan. 4, 1927 |
| 2,307,247 | Tuck et al. | Jan. 5, 1943 |
| 2,495,320 | Franck | Jan. 24, 1950 |

FOREIGN PATENTS

| 351,761 | Great Britain | July 2, 1931 |
| 485,801 | Great Britain | May 25, 1938 |